United States Patent
Gentile et al.

(10) Patent No.: US 6,994,831 B1
(45) Date of Patent: Feb. 7, 2006

(54) OXIDATIVE TRITIUM DECONTAMINATION SYSTEM

(75) Inventors: Charles A. Gentile, Plainsboro, NJ (US); Gregory L. Guttadora, Highland Park, NJ (US); John J. Parker, Medford, NJ (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 412 days.

(21) Appl. No.: 10/279,121

(22) Filed: Oct. 23, 2002

(51) Int. Cl.
*B01J 19/08* (2006.01)

(52) U.S. Cl. .................. 422/186.12; 422/228
(58) Field of Classification Search ........... 422/186.12, 422/228
See application file for complete search history.

(56) References Cited

U.S. PATENT DOCUMENTS 6,212,792 B1 * 4/2001 Bier ............................ 34/315

FOREIGN PATENT DOCUMENTS

EP            0492040 A1  *  7/1992
JP            7-051500 A   *  2/1995

* cited by examiner

*Primary Examiner*—Kishor Mayekar
(74) *Attorney, Agent, or Firm*—Bradley W. Smith; Mark P. Dvorscak; Paul A. Gottlieb

(57) ABSTRACT

The Oxidative Tritium Decontamination System, OTDS, provides a method and apparatus for reduction of tritium surface contamination on various items. The OTDS employs ozone gas as oxidizing agent to convert elemental tritium to tritium oxide. Tritium oxide vapor and excess ozone gas is purged from the OTDS, for discharge to atmosphere or transport to further process. An effluent stream is subjected to a catalytic process for the decomposition of excess ozone to diatomic oxygen. One of two configurations of the OTDS is employed: dynamic apparatus equipped with agitation mechanism and large volumetric capacity for decontamination of light items, or static apparatus equipped with pressurization and evacuation capability for decontamination of heavier, delicate, and/or valuable items.

11 Claims, 4 Drawing Sheets

OXIDATIVE TRITIUM DECONTAMINATION SYSTEM

CONTRACTUAL ORIGIN OF THE INVENTION

The United States Government has rights in this invention pursuant to Contract No. DE-AC02-76CH03073 between the U.S. Department of Energy and Princeton University.

FIELD OF THE INVENTION

This invention relates to a method and apparatus for reduction of surface tritium activity characteristic of contaminated species to levels permissible for unrestricted handling (<1000 dpm/100 cm$^2$). This method and apparatus is applicable to the safe disposal of expendable items and/or decontamination of reusable items.

BACKGROUND OF THE INVENTION

Prior decontamination methods of this type employed hydrogen peroxide ($H_2O_2$, aqueous) as the oxidizing agent to produce a liquid effluent, which required it disposition as radiological waste. The subject invention entails a reactor with gas-phase constituent as the oxidizing agent. Elemental tritium (any variant, i.e. HT, DT, $T_2$) present in reaction vessel is oxidized to form tritium oxide (any variant, i.e. HTO, DTO, $T_2O$). In the subject invention, sensible heat input facilitates are employed to evaporate the discharge of pre-existing and newly formed tritium oxide. The resulting gas-phase effluent allows for the bulk collection and/or recycling of the tritium via molecular sieve bed, gas holding tank, or tritium purification system (isotope separation).

Thus, it is an object of this invention to:
(a) provide a method and apparatus for the removal of tenaciously held tritium from the surface (and near-surface) of contaminated items.
(b) provide for the removal of the tritium oxide from the reactor to provide for further processing or, if warranted, release to atmosphere.
(d) provide dynamic (rotary) apparatus for decontamination of light items.
(e) provide a static apparatus for decontamination of heavier, delicate, and/or valuable items.

Additional advantages, objects and novel features of the invention will become apparent to those skilled in the art upon examination of the following and by practice of the invention.

SUMMARY OF THE INVENTION

The subject invention, entitled a Oxidative Tritium Decontamination System (OTDS), is designed to reduce tritium surface contamination levels on various tritium-exposed items. The system is configured to introduce gas-phase ozone ($O_3$) into a reaction vessel containing items that require a reduction of tritium surface contamination. The reduction of surface tritium contamination is achieved by converting elemental tritium to tritium oxide through an oxidation process, and purging the reactor effluent to a further process or a negative pressure HVAC system. Implementation of specific concentrations and flow rates of ozone in conjunction with (optional) catalytic parameters facilitates reduction of tritium surface contamination to levels permissible for unrestricted handling (safe disposal and/or free release) of items (<1000 dpm/100 cm$^2$)

BRIEF DESCRIPTION OF THE DRAWINGS

FIG. 2$b$ is a matte surface depiction of the static (stationary) apparatus.

DETAILED DESCRIPTION OF THE INVENTION

Figure 1A:
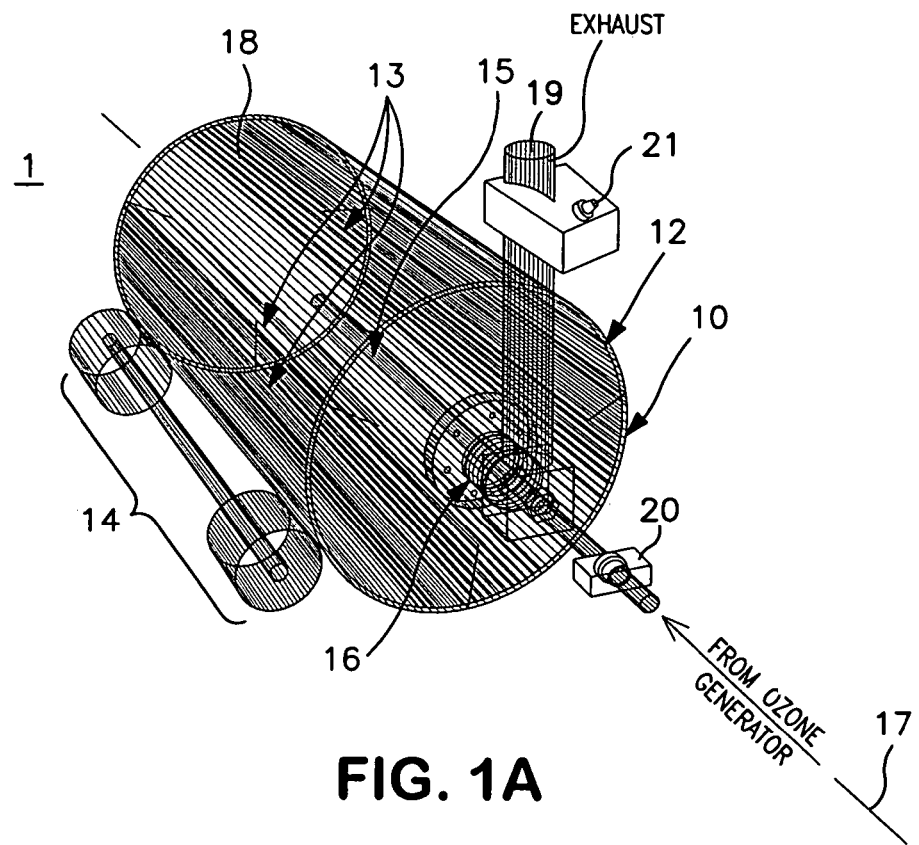
FIG. 1$a$ is a wireframe schematic diagram of the dynamic (rotary) apparatus
FIG. 1$b$ is a matte surface depiction of the dynamic (rotary) apparatus.
Figure 1B:
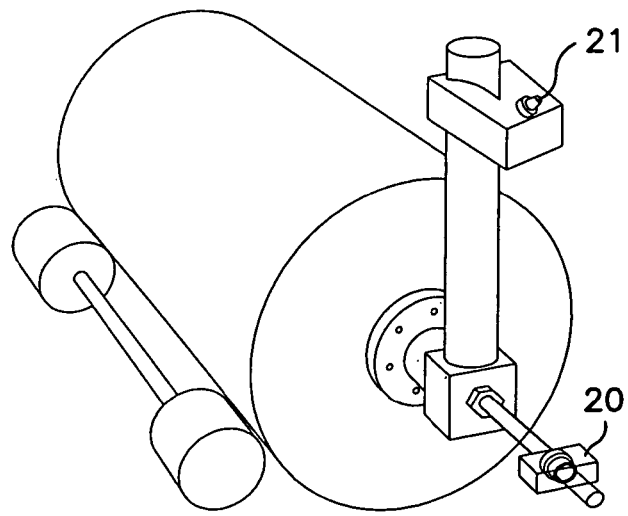

One of two configurations of the OTDS is employed, as per the category of item to be subjected to the decontamination process. The chemical concept involved with each apparatus is the same; however, each allows for a different set of physical parameters to be applied. A dynamic (rotary) apparatus, FIGS. 1$a$ and 1$b$, is used for the decontamination of light items, that are often intended for disposal. A static apparatus, FIGS. 2$a$ and 2$b$, is used for the decontamination of heavier, delicate, and/or valuable items, that are often intended for reuse. Parameters inclusive of agitation mechanism, gas flow profile, and item volume per reactor volume (1-E, where E represents the void fraction) can be easily varied and monitored with the "dynamic" apparatus; while parameters inclusive of pressure, temperature, and ultraviolet light catalysis (activation parameters, e.g. ultraviolet light, not necessary for reaction to proceed) can be easily varied and monitored with the "static" apparatus.

Figure 3:
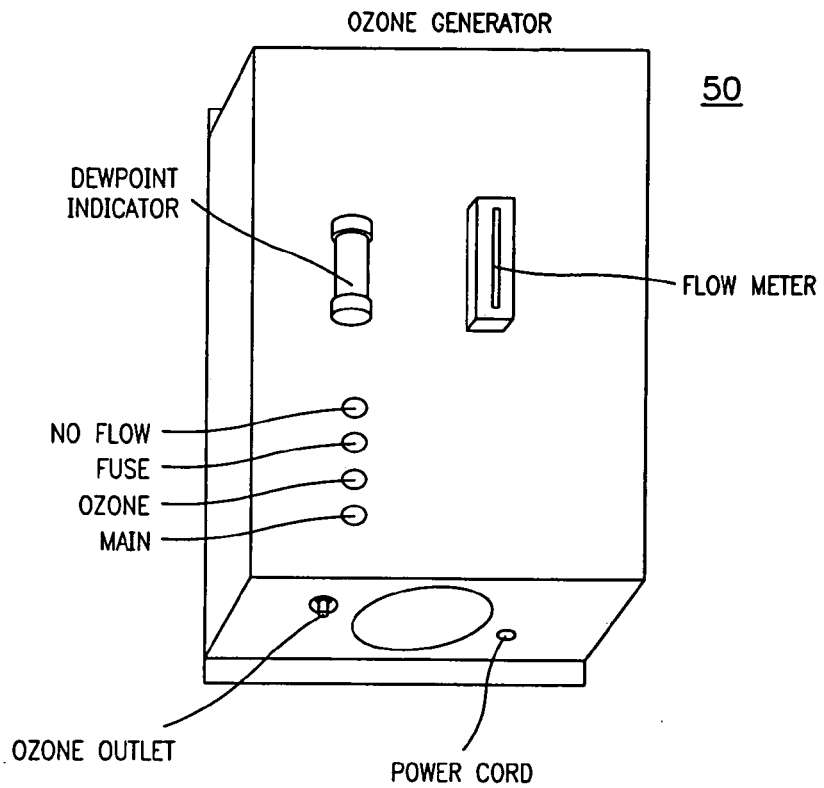
FIG. 3 is a schematic diagram of the ozone generator.

The rotary apparatus 1 FIGS. 1$a$ and 1$b$ consist of a cylindrical, rotatable stainless steel reaction vessel 10. A stainless steel mesh basket 12 fits the interior contour of the reaction vessel 10 in such a manner that it provides for the coupling of the two items such that the angular rotation of both items is concurrent during operation. A series of internal baffles 13 are affixed to the interior of the mesh basket 12. The baffles 13 serve to agitate items as the reaction vessel 10 rotates about its axial centerline 17. A rotary actuator 14 engages the exterior surface 18 of the reaction vessel 10. The actuator 14 is capable of varying its direction of rotation and it rotational velocity. An ozone generator (corona discharge unit), FIG. 3, supplies ozone to the reaction vessel 10 by means of an aluminum feed pipe 15. The feed pipe 15 provides for the permeation of the ozone gas throughout the entire reaction vessel 10. The feed pipe 15 enters the reaction vessel by means of a mechanical flange 16 that is coupled to the reaction vessel 10 via a dynamic seal, an elastomer o-ring or other suitable interface. This seal and a negative pressure head prevents the transfer of tritium and/or the ozone gas to the ambient environment.

Figure 2A:
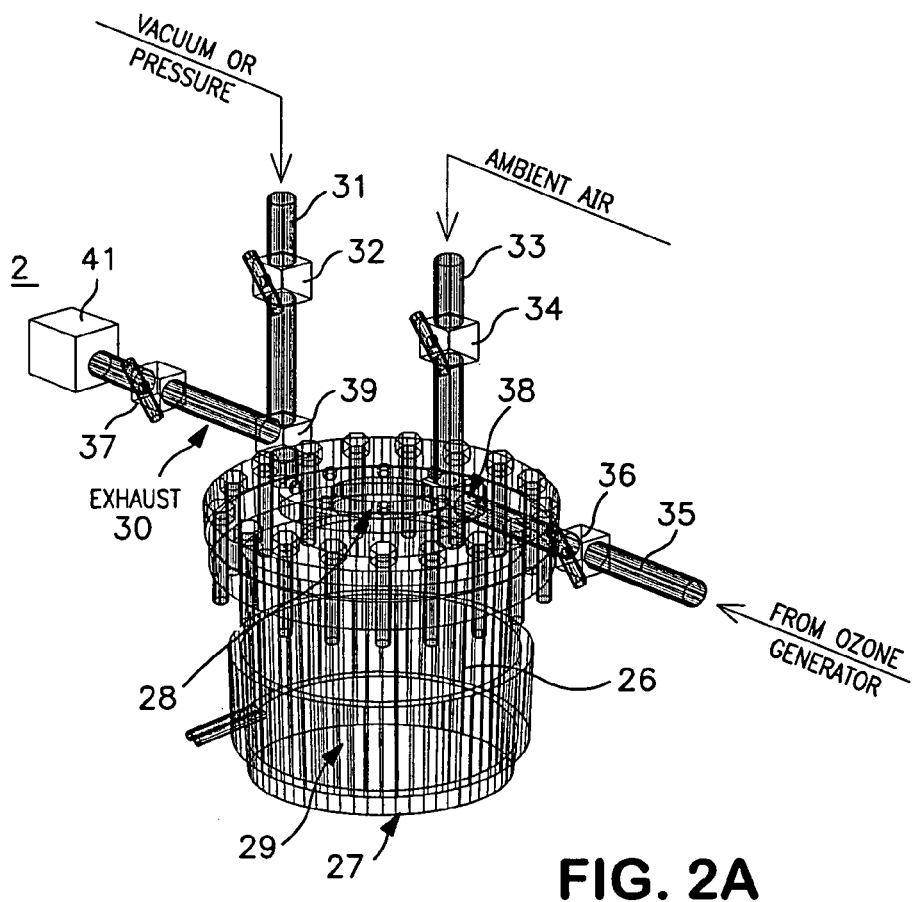
FIG. 2$a$ is a wireframe schematic diagram of the static (stationary) apparatus.
Figure 2B:
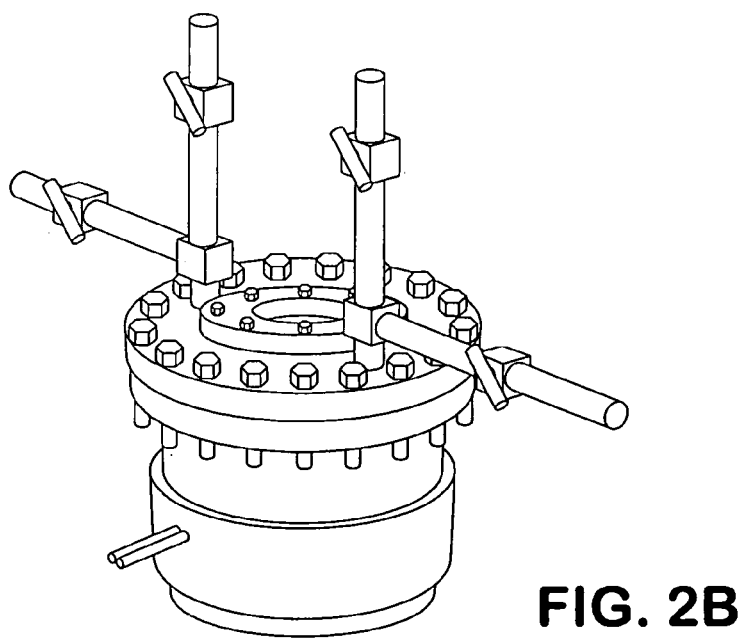

The static apparatus 2, FIGS. 2$a$ and 2$b$ consist of a stationary, thick-walled cylindrical stainless steel reaction vessel 27, which provides for the containment of item(s) during the decontamination process. In Applicants' enablement, the reaction vessel 27 can retain a high vacuum and can sustain a pressurization above atmospheric conditions. A sapphire ($Al_2O_3$) optical window 28 allows high transmission of radiation in the ultraviolet wavelength range into the interior 26 of the reaction vessel 27. When an external ultraviolet light source is used as a catalyst, the sapphire window 28 transmits >70% of the incident photonic energy. An integrated temperature control device 29 is used to regulate the internal gas temperature of the reaction vessel 27. For both configurations (dynamic and static), the effluent gas is purged to a further process or a negative pressure HVAC system via exhaust line FIG. 1a, 19 and FIG. 2a, 30 respectively where the processing units are: FIG. 1a, 20 and FIG. 2a, 41.

Figure 5:
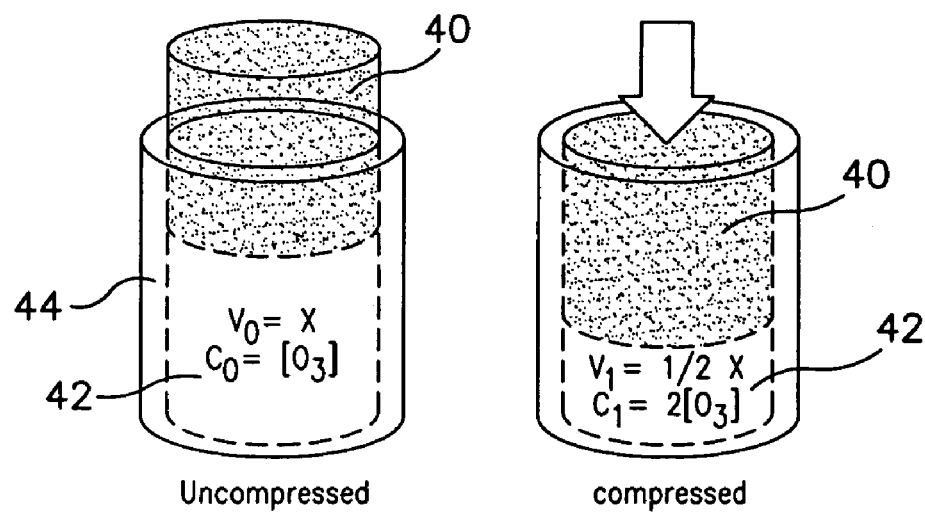
FIG. 5 is a figure of the piston-cylinder configuration for the static (stationary) apparatus.

In an alternate embodiment of the stationary apparatus, FIG. 5, a piston 40 is positioned above the contaminated item(s) 42. Following injection of ozone into the cylindrical reaction vessel 44, the piston 40 is engaged by a shaft, hydraulic source or other driving mechanism to apply a pressure of several times above atmospheric to the solid-gas (i.e. contaminated item(s) and ozone gas) mixture. This increases the concentration of ozone per unit volume. The reduction in volume and consequential increase in concentration promotes deeper penetration of ozone (also diatomic and free radical oxygen) into the contaminated item(s).

In the static apparatus, FIG. 2a, ozone gas enters the reaction vessel through the ozone feed line 35 which is controlled by valve 36. Ambient air enters the reaction vessel through air line 33 which is controlled by valve 34. As mentioned, the exhaust gas exits through exhaust line 30 which is controlled by valve 37. Finally, a vacuum is attained or a pressure head applied by pulling a vacuum or pressurizing the apparatus using pressure/vacuum line 31 controlled by valve 32. The air line 33 ties into the feed line 35 at a junction 38 which is downstream from valve 36 and upstream from where the feed line enters the reaction vessel. The pressurization line 31 is coupled at junction 39 to the exhaust line 30 where said junction 39 is positioned upstream from exhaust control valve 37, placing the junction 39 between the control valve 37 and the reaction vessel. If needed the exhaust line is coupled to a processing device, FIG. 1a, 21 and FIG. 2a, 41, to lower the concentration of undesirable gases.

The chemical reaction between triatomic oxygen (ozone) and diatomic hydrogen (and all isotopic variants thereof adheres to a pseudo-first order electron transfer (oxidation-reduction) mechanism, by which triatomic oxygen serves as the oxidizing agent. Activation parameters are unnecessary for the reaction to proceed, as per the high molecular instability of triatomic ozone (and free radical oxygen). The mechanism involves a sequence of half-reactions, followed by the combination of hydrogen (oxidation number is +1) and oxygen (oxidation number is −2) ions to form hydrogen oxide (i.e. water). Chemical by-product of this reaction mechanism is a diatomic oxygen molecule (as per the reaction mechanism to follow). Intermediary formation of hydroxyl ions (OH⁻) may further contribute to overall reaction procession (for situations where polar bonds exist between species). Standard reduction potential is 2.07 V for triatomic oxygen and 2.42 V for oxygen ions. The reaction mechanism (excluding hydroxyl ion formation) is given by the following equations, where $^{n}H$ represents any isotope of hydrogen present in the system.

REACTION:

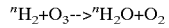

$$^{n}H_2 + O_3 \rightarrow {^{n}H_2O} + O_2$$

MECHANISM:

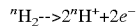

$$^{n}H_2 \rightarrow 2{^{n}H^+} + 2e^-$$

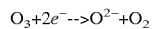

$$O_3 + 2e^- \rightarrow O^{2-} + O_2$$

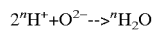

$$2{^{n}H^+} + O^{2-} \rightarrow {^{n}H_2O}$$

A series of ancillary reactions (aforementioned reaction mechanism considered as primary) are subject to occur, the type and/or extent of which are governed by operational conditions (thermal, mechanical, etc.) and by specific chemical species present in the reaction vessel. These reactions, though of secondary importance, facilitate adjunct liberation of tritium (diatomic and oxide). Ancillary reactions are inclusive of: oxidation of elemental carbon to carbon dioxide (and carbon monoxide), reaction of diatomic nitrogen (ambient air contains 79% diatomic nitrogen, approximate) with diatomic hydrogen (tritiated variants) to yield tritiated ammonia (anhydrous and aqueous), and depolymerization of complex hydrocarbon plastic/elastomer via oxidative dissociation of chain and/or crosslink matrix. If tritiated ammonia is an undesired constituent in effluent stream, employing halogen-inerted diatomic oxygen feedstock (i.e. $xAr+yO_2$) to eliminates nitrogen from reaction process.

Required residence time for triatomic oxygen (individual molecule basis) in reaction vessel is relative to the net molecular concentration per unit volume within the reaction vessel. Thus, inherent residence time is controlled through adjustment of the diatomic oxygen concentration present in feedstock to the ozone generation unit, FIG. 3, 50, (via pure diatomic oxygen or diatomic oxygen/inert gas mixture), adjustment of volumetric flow rate through reactor, and/or adjustment of reaction vessel volume (via piston-cylinder mechanism). By passing the reaction vessel feed stream (and/or the ozone generator feedstock) through a desiccant unit, FIGS. 1a and 1b, 20, prior to reaction vessel entry, evaporation of tritium oxide will occur at a higher rate since relative humidity within reaction vessel is decreased. This phenomenon decreases the time required for a single batch process and reduces the possibility of intermediary hydroxyl radical formation, which can impede the kinetics of the primary reaction mechanism.

Figure 4:
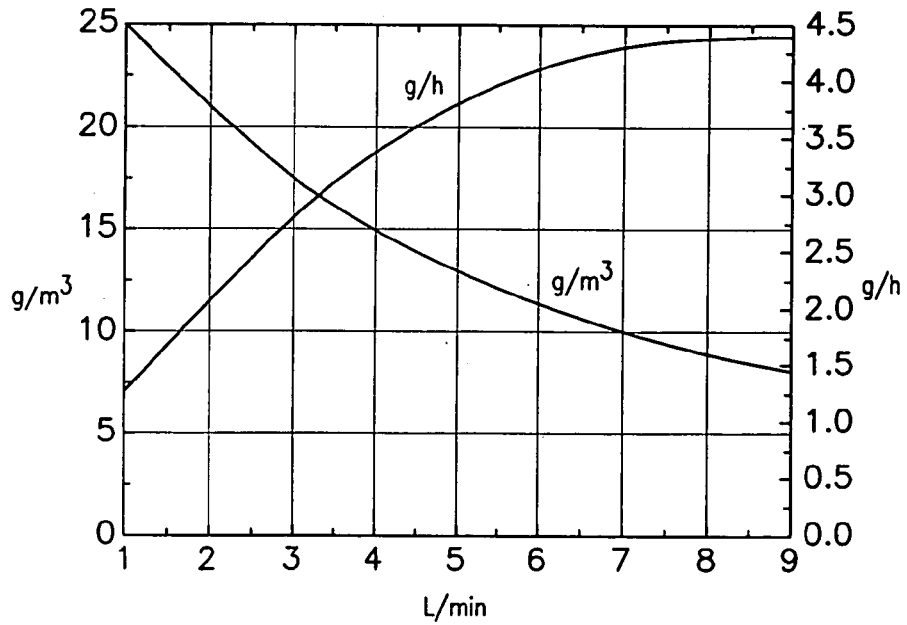
FIG. 4 is a plot showing the performance output for the ozone generator as a function of flow rate.

The ozone generator 50 supplies gas-phase ozone at a concentration and mass production rate relative to the ozone generator 50 feedstock flow rate. The performance output graph for the ozone generator 50, FIG. 4, indicates that at the maximum part-per-million flow rate, approximately 1 L/min, the volumetric part-per-million ozone concentration will be 11674 ppm (calculated). At most, 10% of this ozone content will be consumed/disassociated during the reaction process. The remaining process effluent is exhausted to negative pressure HVAC system. In most cases, ductwork of HVAC systems is constructed of ferrous metal (or other reactive species), which exhibits corrosion when exposed to strong oxidizing agents (i.e. ozone) of high concentration. In addition, ozone will degrade reactive polymer composite seals present in HVAC system. Thus, to prevent this corrosion, it is necessary to significantly reduce the release of ozone from the OTDS reactor. Several options for reactor post-process ozone decomposition are possible.

For example, triatomic oxygen can be converted to diatomic oxygen via application of energy in the form of sensible heat. For complete conversion to occur, ozone must be held at a temperature exceeding 300° C. for an approximate 3 second duration. Process energy requirements for thermal decomposition are therefore significantly large. The energy expenditure for this option is large; however, approximately 65% of the energy can be recovered through a heat exchange device.

This reaction occurs as follows:

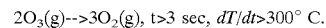

$$2O_3(g) \rightarrow 3O_2(g), \; t > 3 \text{ sec}, \; dT/dt > 300° \text{ C.}$$

Another option involves the removal of moderate ozone levels present in the reactor effluent via implementation of activated carbon particulates and/or filter medium. Ozone molecules incident on the carbon surface react to form carbon dioxide (carbon monoxide secondary) via direct chemical oxidation. To remove adequate levels of ozone from the effluent stream, an approximate 3 second residence time must be attained.

Through the following reactions:

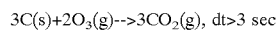

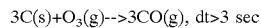

Ozone decomposition is governed by the limiting reagent (in this case, activated carbon). As the reaction proceeds, carbon is consumed, and eventually reaches the breakthrough point (ratio of the effluent ozone concentration to the feed ozone concentration is no longer favorable, as per reactor and industrial hygiene constraints). Thus, using this method activated carbon must be replenished periodically.

In another alternative, the preferred method, a manganese dioxide based (hopcalite) packed column/bed process can be implemented for ozone decomposition under ambient temperature conditions (22–23° C.). Molecular interaction between triatomic oxygen and manganese dioxide is a physical (catalytic) process; thus, hopcalite is not consumed over time. Hopcalite induced decomposition requires an approximate 0.36–0.72 second residence time, and can achieve $\geq 99\%$ conversion for ozone concentration <120,000 ppm. Percentage conversion of ozone is determined by the following equation.

$$\% \text{ O3 Destruction} = 100/[1+\exp(F)]$$

$$F = -8.7 + 0.22 \times 1 - 2.16 \times 2 - 0.74 \times 3 + 0.018 \times 4 + 0.018 \times 5$$

where:

$$x1 = 1000/(T+25) \ T=\text{temperature, } ° \text{C.}$$

$$x2 = \ln(\tau - 0.03) + 1.4 \ \tau=\text{residence time, s}$$

$$x3 = v \ v=\text{linear velocity, ft/s}$$

$$x4 = RH - 67 \ RH=\text{relative humidity, } \% \text{ at } 23° \text{ C.}$$

$$x5 = (x2)(x4)$$

As per the primary reaction mechanism associated with the subject invention, triatomic oxygen is reacted with diatomic hydrogen to form tritium oxide (in cases where tritiated variant is present). However, tritium oxide formed via this reaction mechanism is not removed from surface of items through chemical process (majority of tritium oxide remains as condensate). An evaporative process has been included to facilitate removal of tritium oxide from the surface of items and evacuation from the reaction vessel.

Tritium oxide possesses thermodynamic properties almost identical to that of hydrogen oxide ($^1H_2O$). Evaporation of tritium oxide is thus achieved via application of thermodynamic parameters quite similar to those required for hydrogen oxide evaporation. Parameters include the following: temperature, pressure, and percent relative humidity within the reaction vessel. These parameters influence the overall evaporation rate. Overall evaporation rate is dependant on the aforementioned parameters, along with tritium oxide condensate surface area, air/gas velocity over tritium oxide condensate surface, and tritium oxide latent heat of vaporization). Theoretical determination of tritium oxide evaporation rate at specific time is as follows.

$$r = \cent(A)(C_1 + vC_2)(p^* - P_{DP})/(\Delta \hat{H}_V)$$

where:
r=evaporation rate (mass/time)
¢=dimensional consistency factor
A=condensate surface area
$C_1$=constant (energy/time/area)
$C_2$=constant (energy/time/area)
v=air/gas velocity surface
p*=saturation vapor pressure
$P_{DP}$=saturation pressure at dewpoint
$\Delta \hat{H}_V$=latent heat of vaporization The foregoing description of applicable embodiments of the invention has been presented for purposes of illustration of principle. It is not intended to be exhaustive or to limit the invention to the precise embodiments disclosed, as has been made apparent that several modifications and/or variations are possible in light of the foregoing description. The embodiments described explain the principles of the invention and practical applications, and should enable others skilled in the art to utilize the invention in various embodiments and with various modifications, as are suited to the contemplated use. It is intended that the scope of the invention be defined by the claims appended hereto.

We claim:

1. A dynamic (rotary) system for tritium decontamination, comprising:
an exterior reaction vessel having a first interior chamber and a rotational axis positioned along an axis of symmetry of said exterior reaction vessel;
an interior reaction vessel positioned in said first interior chamber and having a capability to house a group of one or more tritium contaminated items and where said interior reaction vessel is mechanically coupled by means of structural configurations on an interior surface of said exterior reaction vessel which essentially matching a plurality of structural configurations on an exterior surface of said interior reaction vessel so that movement of said exterior reaction vessel is transferred to said interior reaction vessel causing a similar movement;
a means for generating a flow of zone gas from an ozone generator to an interior chamber of said interior reaction vessel;
a means for removing moisture from said flow of ozone gas where said moisture removing means is coupled by means of a first connecting pipe to an outlet port on said ozone generator and by means of a second connecting pipe to an inlet port leading to said interior chamber;
a means for rotating said exterior reaction vessel about said rotational axis where said rotational means is coupled to an external surface of said exterior reaction vessel;
a means for sealing said interior chamber from an ambient environment;
an exhaust line coupled to said exterior reaction vessel to allow an effluent gas generated in said interior chamber to flow from said interior chamber of said exterior reaction vessel to a processing unit where the effluent gas is cleaned of products which are determined should not to be released to an open stack;

a means for providing a negative pressure to an interior passage of said exhaust line to provide a pressure differential to expedite removal of said effluent gas from said inner chamber.

2. The apparatus of claim 1 wherein an interior surface of said interior reactor vessel is equipped with an agitation mechanism to provide for increased contact between the ozone gas and the contaminated items.

3. The apparatus of claim 1 wherein said rotating means contacts said exterior surface of said exterior reactor vessel and allows for a variable rotational speed and a variable direction of rotation for said exterior reaction vessel.

4. The apparatus of claim 1 wherein said interior reaction vessel fits an interior contour of said exterior reaction vessel to allow for loading and unloading of items subject to the decontamination process through removal and replacement of said interior reaction vessel and where said interior contour serves to mechanically couple said interior reaction vessel to said exterior reaction vessel so that a rotation of said exterior reaction vessel is paralleled by a similar rotation of said interior reaction vessel.

5. The apparatus of claim 4 wherein said interior reaction vessel has a plurality of baffles attached to an interior surface of said interior reaction vessel to serve as agitation means.

6. The apparatus of claim 1 wherein said sealing means is a comprised of one or more dynamic seals to allow free rotation of said exterior reaction vessel.

7. The apparatus of claim 6 where said dynamic seals are o-rings.

8. The apparatus of claim 1 where said second connecting pipe extends into said interior chamber to an extent adequate for the permeation of said ozone gas throughout said interior chamber of said interior reaction vessel.

9. The apparatus of claim 1 where said ozone generator is capable of producing varied concentrations of ozone and varied volumetric flow rates of said ozone gas.

10. The apparatus of claim 1 where the processing unit contains a manganese dioxide based (hopcalite) packed column/bed.

11. The apparatus of claim 1 where said moisture removal means is a desiccant unit.

* * * * *